US009097316B1

(12) United States Patent
Pentland

(10) Patent No.: US 9,097,316 B1
(45) Date of Patent: Aug. 4, 2015

(54) CONTROLLABLE KINETIC FLEXIBLE MEMBER IMAGERY SYSTEM

(71) Applicant: Joseph C. Pentland, Bridgeport, CT (US)

(72) Inventor: Joseph C. Pentland, Bridgeport, CT (US)

( * ) Notice: Subject to any disclaimer, the term of this patent is extended or adjusted under 35 U.S.C. 154(b) by 0 days.

(21) Appl. No.: 14/162,519

(22) Filed: Jan. 23, 2014

Related U.S. Application Data

(60) Provisional application No. 61/755,728, filed on Jan. 23, 2013.

(51) Int. Cl.
*G09F 19/00* (2006.01)
*F16H 7/22* (2006.01)
*G09F 19/10* (2006.01)

(52) U.S. Cl.
CPC . *F16H 7/22* (2013.01); *G09F 19/10* (2013.01)

(58) Field of Classification Search
CPC ....................................................... G09F 19/10
USPC ........... 40/427, 429, 438, 463, 466, 470, 603, 40/471, 513; 446/308, 309, 484, 486
See application file for complete search history.

(56) References Cited

U.S. PATENT DOCUMENTS

| | | | | |
|---|---|---|---|---|
| 5,766,700 | A * | 6/1998 | Borcherds | 428/5 |
| 6,006,476 | A * | 12/1999 | Zarnick | 52/6 |
| 6,125,905 | A * | 10/2000 | Woodside et al. | 160/67 |
| 2010/0252207 | A1* | 10/2010 | Westgarth | 160/45 |

* cited by examiner

*Primary Examiner* — Joanne Silbermann
(74) *Attorney, Agent, or Firm* — Drinker Biddle & Reath LLP

(57) ABSTRACT

An apparatus for moving one or multiple flexible members to produce kinetic imagery where the flexible members have two spaced endpoints and are suspended in a curve from the endpoints. A drive mechanism is provided for continuously lengthening and shortening the distance between the endpoints and/or for varying the lengths of the flexible members, and a control unit is present for operating the drive mechanism.

18 Claims, 4 Drawing Sheets

CONTROLLABLE KINETIC FLEXIBLE MEMBER IMAGERY SYSTEM

CROSS-REFERENCE TO RELATED PATENT APPLICATIONS

This patent application claims the benefit of U.S. Provisional Patent Application No. 61/755,728, filed Jan. 23, 2013.

FIELD OF THE INVENTION

This invention relates generally to positioning flexible members in space and, more particularly, to methods and apparatus for moving individual or multiple flexible members in space in unique new ways to produce kinetic imagery.

BACKGROUND OF THE INVENTION

From almost the inception of kinetic art, people have been interested in moving objects in space and time in order to create visual effects. For centuries, this art form relied on human/solar/wind/magnetic powered motion. For most of the twentieth century it has been limited primarily to single speed art pieces and objects rather than flexible members. While more complex kinetic art became possible when transmissions could be used to vary speed, still kinetic art pieces have been limited to objects (rather than flexible members) moved at a discreet small number of speeds.

SUMMARY

Embodiments of this invention comprise systems for producing kinetic imagery using pulleys and/or linear actuators to raise and lower curves formed by individual or multiple ropes, strings, cables, bands, tubes, or other flexible members hanging as catenaries. The term "catenaries" refers here to downwardly extending curves formed by flexible members suspended from their endpoints. The downwardly extending curves will have continuously changing bottom-most points which are referred to here as "curve bottoms."

Embodiments relate to apparatus and methods for continuously varying the distance between curve bottoms of the catenaries, for varying the lengths of the catenaries, and for lengthening and shortening the distances between the endpoints of the catenaries. This can be accomplished in accordance with embodiments with a controller operated motor/pulley system, a controller operated motor/linear actuator system or combinations of the two. The motor may be a stepper motor or a servo motor. Other embodiments drive and preferably synchronize the movement of multiple catenaries (and their curve bottoms) by tracking the instantaneous positions of the pulleys and/or actuators or their drive motors and precisely controlling their speed and direction to synchronize the movement of the multiple catenaries.

BRIEF DESCRIPTION OF THE DRAWINGS

In order to aid in understanding the invention, it will now be described in connection with exemplary embodiments thereof with reference to the accompanying drawings in which like numerical designations will be given to like features with reference to the accompanying drawings wherein.

DETAILED DESCRIPTION OF THE INVENTION

The embodiments of the invention described below are not intended to be exhaustive or to limit the invention to the precise structures and operations disclosed. Rather, the described embodiments have been chosen to explain the principles of the invention and its application, operation and use in order to best enable others skilled in the art to follow its teachings.

Figure 1:
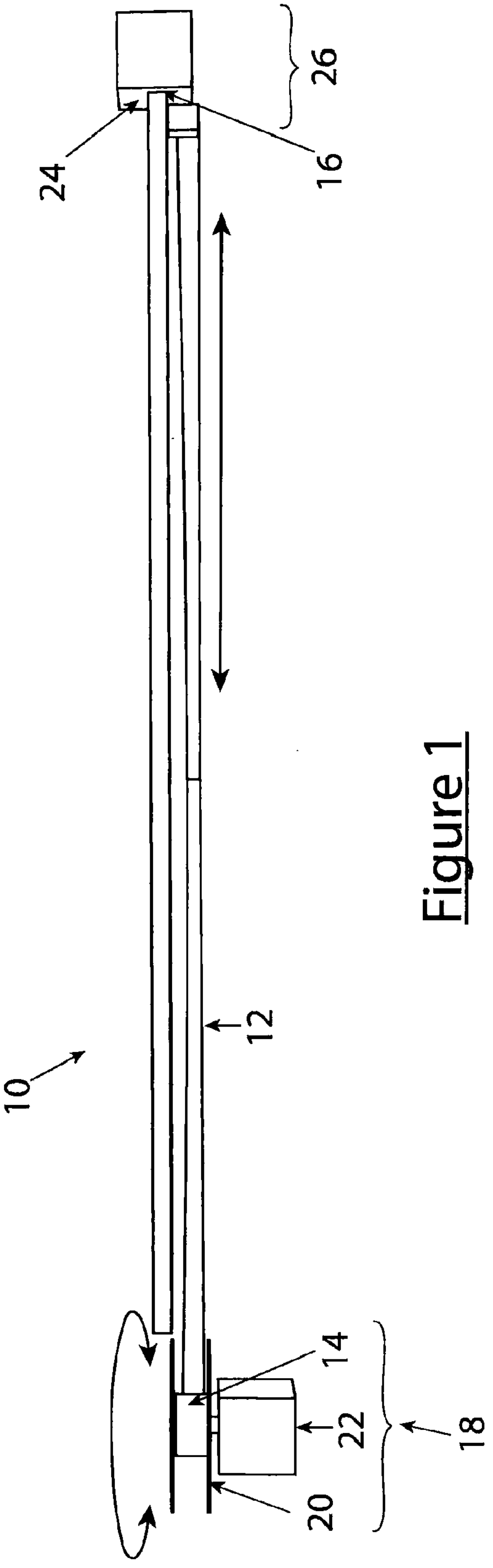
FIG. 1 is a top plan view of a catenary embodiment of the apparatus.

Referring to FIG. 1, a flexible member imagery system 10 is illustrated in which a catenary 12 is suspended from catenary endpoints 14 and 16. In this figure, catenary endpoint 14 is shown associated with a drive mechanism 18 comprising a pulley wheel 20 driven by a pulley stepper motor 22. Catenary endpoint 14 is attached to the pulley which will continuously reel and unreel the catenary so that the point at which the catenary is suspended is advanced down and back along the catenary.

In one embodiment, endpoint 16 of the catenary may be fixed in space at a predetermined location 24 spaced from endpoint 14. In other words, drive mechanism 26 would not be present in this embodiment). Also, in this embodiment, the catenary may be braided PET (polyethylene terephthalate) sleeving, which is currently preferred because of its light weight and compressibility. The catenaries used in this and other embodiments, however, may be any flexible member including, for example, ropes, strings, yarn, cables, bands, chains, beaded strings, belts or tubes. Also, the catenaries may be made of any material and in any dimension which will enable them to hang down and flex in response to operation of the one or more drive mechanisms described below.

Figure 2:
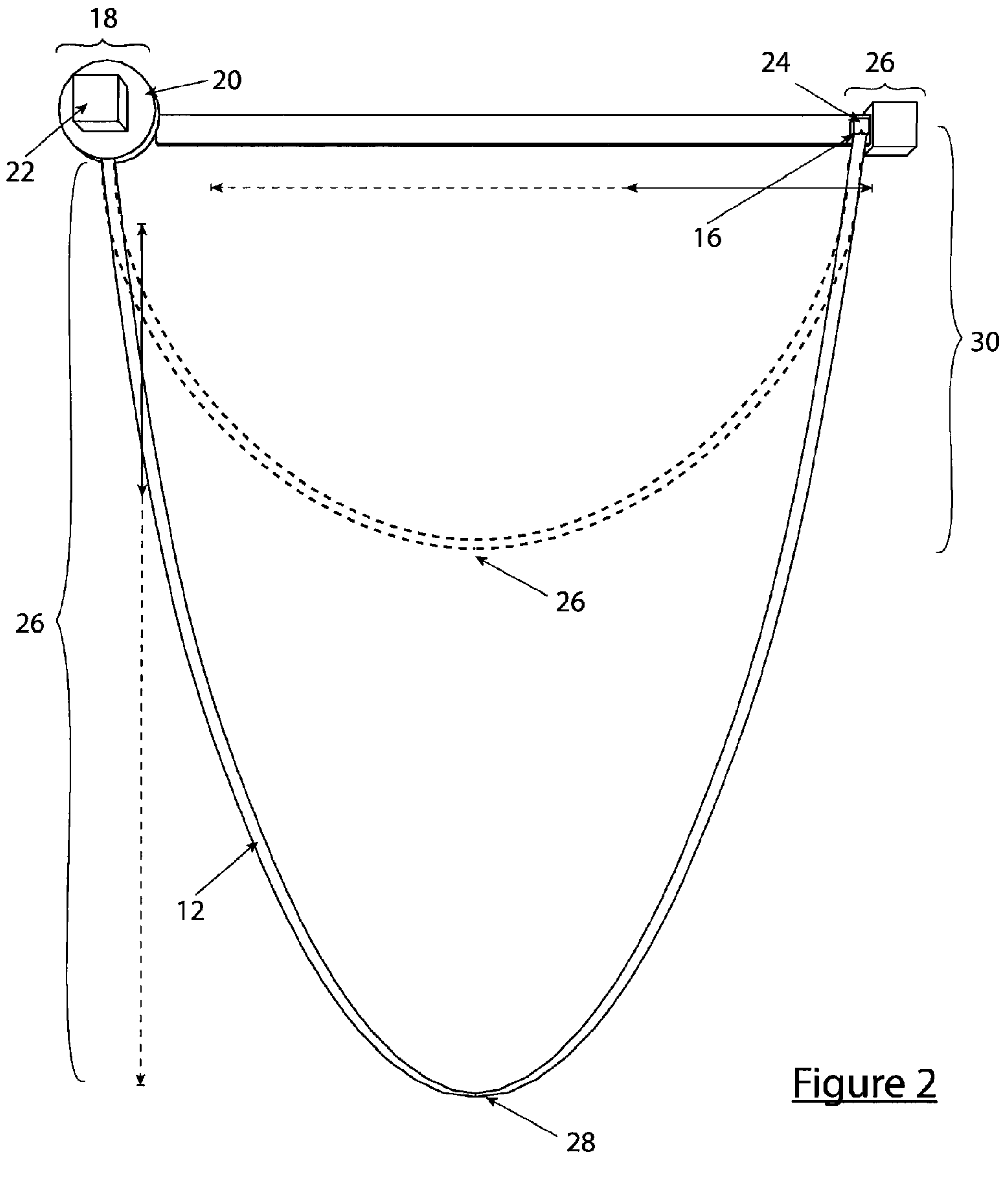
FIG. 2 is a front elevation view of the catenary embodiment of FIG. 1.

Catenary 12 may be observed hanging down from drive mechanism 18 in the front elevation view of FIG. 2. In this figure, catenary 12 is in its maximum extended lower position 26, where the catenary is entirely reeled out from pulley wheel 20 and the catenary curve bottom 28 is at its lowest position. As motor 22 is activated and rotates to reel in the catenary, the catenary will move upward, generally flattening, and translating curve bottom 28 of the catenary vertically upward to an arbitrarily chosen upper position 30. Thus, when the catenary reaches position 30, the operation of the drive mechanism will be reversed, to return the catenary to its maximum extended lower position 26. Motor 22 rotates both clockwise and counterclockwise so that it can continuously reel in and unreel the catenary to produce this effect.

While the figures show flexible members hanging from two points fixed at 24 (and rotatably attached to reel 20) that are on the same horizontal level, in alternative embodiments these points need not be on the same horizontal level and they need not be fixed. Thus, the endpoints of the catenary may be supported at the same height or in line with each other or they may be supported at different heights. Alternatively, the respective levels of the catenary endpoints will change the catenary shapes possible in accordance with other embodiments.

In an alternate embodiment, a drive mechanism 26 in the form of a stepper motor driven linear actuator 30 may be used in lieu of motor driven pulley wheel 20 at either catenary endpoint. In this embodiment, the linear actuator will move horizontally back and forth causing catenary curve bottom 28 to be continuously raised and lowered, again as illustrated in FIG. 2. In some instances a connecting rod may be used to attach the catenary to the linear actuator.

When a linear actuator is used it may comprise two tensioning pulleys holding a V-belt. One of the tensioning pulleys may be free-spinning while the other is attached to a second controllable stepper motor. By turning the stepper motor in one direction, the V-belt turns, moving the attached catenary away from the V-belt motor and toward the pulley motor, narrowing the catenary. Reversing the stepper motor brings the catenary back towards the motor, widening the catenary.

The controllable motors ensure that the V-belt and pulley never run past their end of travel locations. While the linear actuator in this embodiment is a V-belt setup, any subsystem that produces controllable linear motion will work. For example, a leadscrew drive or a linear motor may be used.

In yet another embodiment, two drive mechanisms may be used, attached respectively at endpoints 14 and 16. These drive mechanisms may comprise, for example, a pulley wheel/stepper motor combination at both ends, a stepper motor driven linear actuator at both ends, or a pulley wheel/stepper motor at one end and a stepper motor/linear actuator at the other. In these embodiments, the two drive mechanisms may be operated simultaneously or sequentially to control the movement of the catenary.

In yet another embodiment, a hybrid drive mechanism in the form of a motor driven pulley 20 mounted on a linear actuator may be used. When such a hybrid drive mechanism is used one end of the catenary will be attached to the reel and the other end fixed in space. In this embodiment, the linear actuator will move the pulley wheel back and forth while the pulley wheel itself continues to reel and unreel the catenary.

Figure 3:
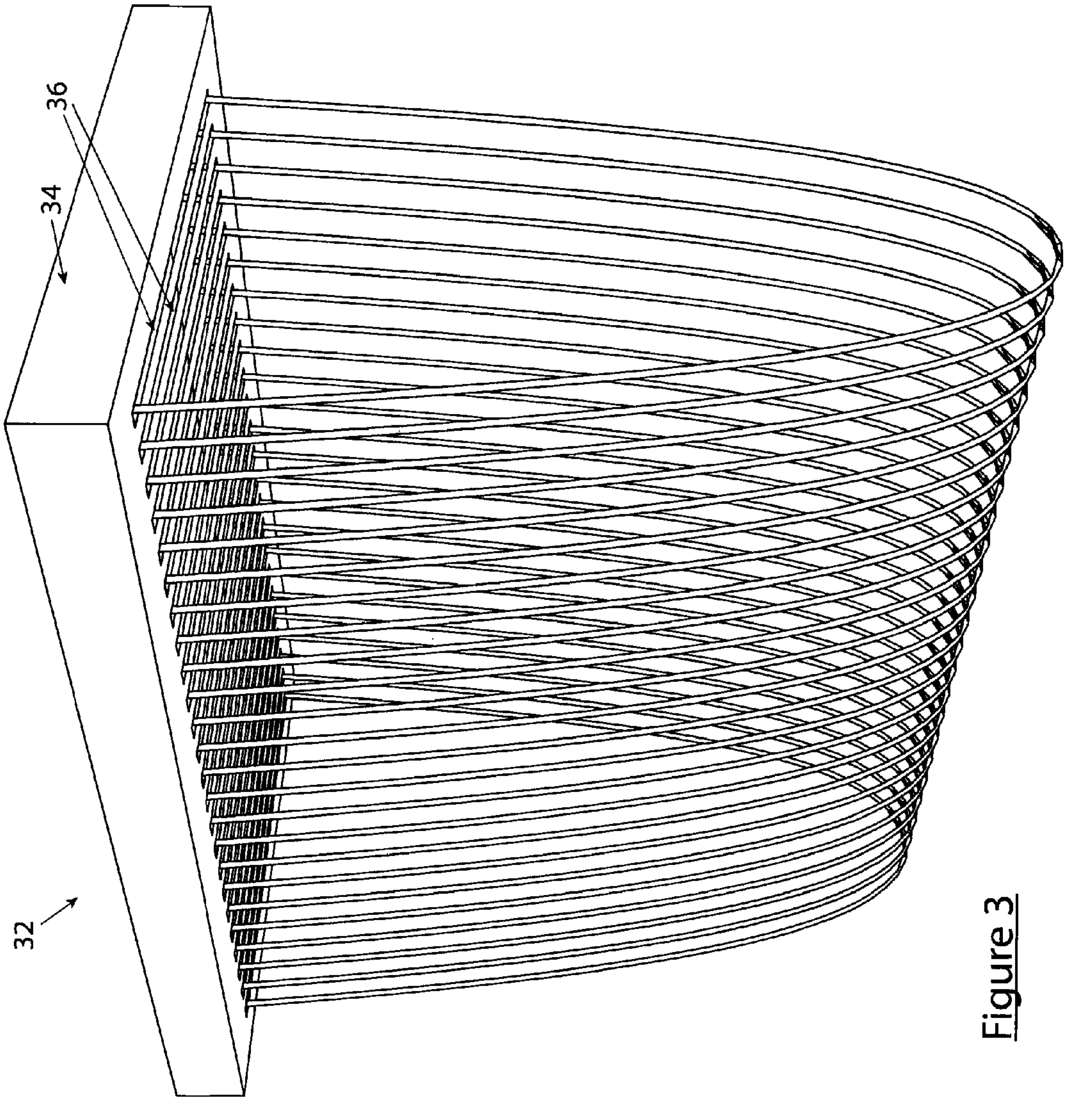
FIG. 3 is a diagrammatic representation of a multiple catenary embodiment.

A multiple catenary embodiment is illustrated in FIG. 3. In this embodiment, multiple catenaries 12 as described above are operated by one or both of a drive mechanism comprising a motor-controlled pulley, a motor-controlled linear actuator, or a combination of the two, as described above. The drive mechanisms are hidden from view in this figure by a support box 34 that includes a series of open slots 36 from which a plurality of catenaries 12 extend. In this embodiment, the instantaneous position of the stepper motors of the pulleys and/or linear actuators are tracked and using this tracking information, a control unit synchronizes the movement of the plurality of catenaries to produce a desired kinetic image. For example, all the catenaries could move up and down simultaneously or the catenaries could move up and down sequentially from one end of the support box to the other and back. In yet another exemplary alternative, every second, every third, etc., catenary could be moved simultaneously to produce yet another kinetic image.

Figure 4:
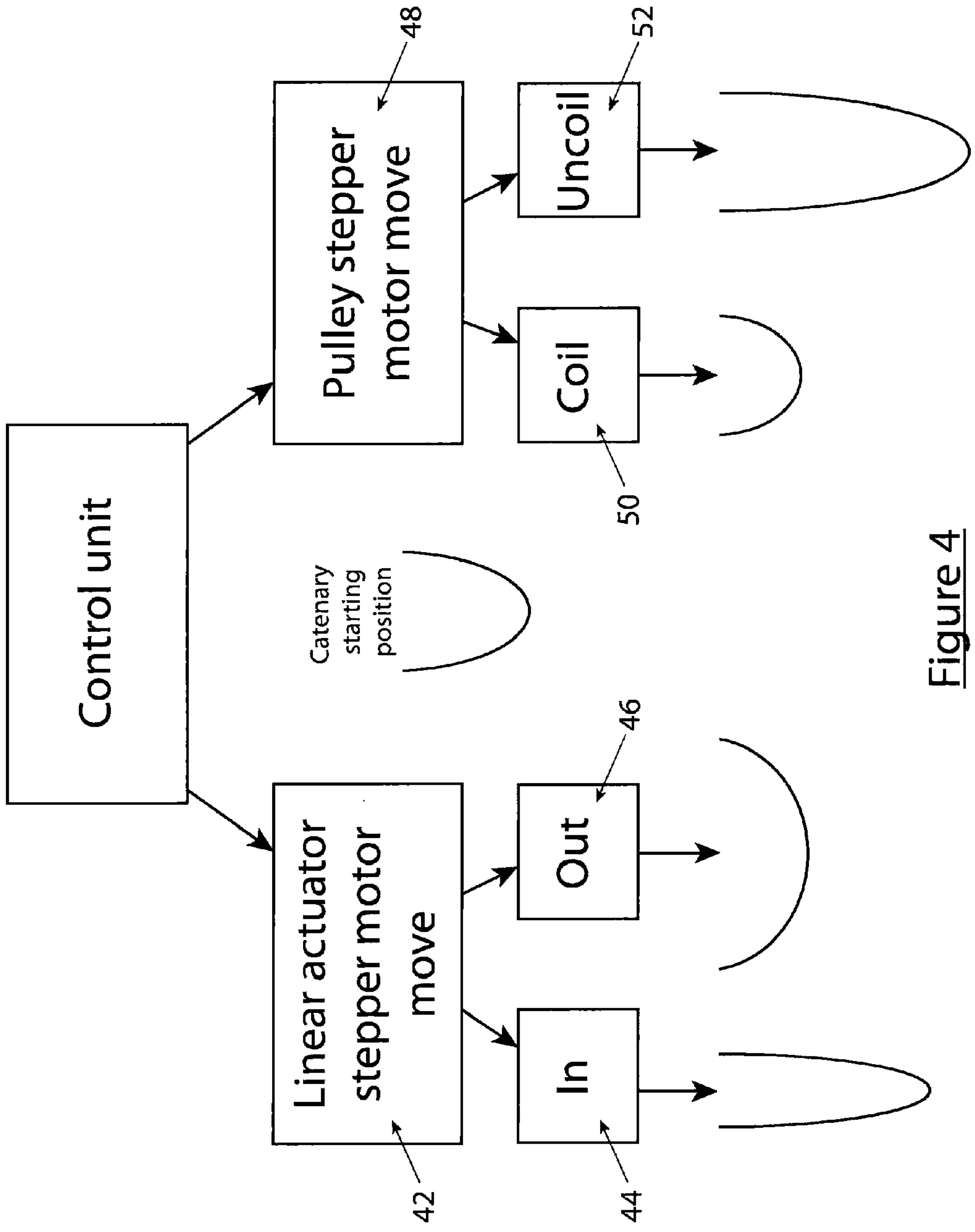
FIG. 4 is a flow diagram illustrating controller operation of an embodiment.

Finally, FIG. 4 is a flow diagram illustrating control unit operation of the apparatus. Thus, as shown, control unit 40 (comprising a processor and memory) is provided to control a linear actuator stepper motor 42. The linear actuator stepper motor will move the hanging points of the catenaries in and out (44, 46). Alternatively, computer processor 40 may control a pulley stepper motor 48. The pulley motor will coil and uncoil the catenary (50, 52).

It should be understood that when reference is made to motors, pulleys, and linear actuators that they are computer controlled. One example of a stepper motor that may be used is a Schenider Electric MDrive Stepper motor systems which is described at http://motion.schneiderelectric.com/products/mdrive_motor_driver.html. Also, any of the stepper motors referenced above may be replaced by servo motors.

Stepper motors are currently preferred because they convert electrical energy into precise mechanical motion. They are called "stepper" motors because they rotate a specific incremental distance per step. The number of steps that are executed controls the degree of rotation of the motor's shaft. The stepper motor controller accurately controls how far and how fast the stepper motor will rotate since the number of steps that the motor executes is equal to the number of pulse commands given by the controller. The stepper motor therefore will rotate a distance and at a rate that is proportional to the number and frequency of these pulse commands. By altering the frequency of the pulse train, the pulse generator instructs the stepper motor to accelerate, run at a certain speed, decelerate, or stop.

While the above disclosure demonstrates selected embodiments of the system, those skilled in the art will understand there are many parameters of the apparatus that can be changed while remaining within the spirit of the disclosure. In view of the many possible embodiments to which the principles of the present discussion may be applied, it should be recognized that the embodiments described herein with respect to the figures are meant to be illustrative only and should not be taken as limiting the scope of the claims. Therefore, apparatus as described herein contemplate all such embodiments as may come within the scope of the following claims and equivalents thereof.

The control unit referenced herein may include a processor, a memory for storing program data to be executed by the processor, an application specific integrated circuit (ASIC), a permanent storage such as a disk drive, a communications port for handling communications with external devices, and user interface devices, including a display, touch panel, keys, buttons, etc. When software is involved, the software may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of various processing steps which may be realized by any number of hardware and/or software components configured to perform as described. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, where connecting lines are shown, the lines are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

The use of the terms "a" and "an" and "the" and similar referents in the context of describing the embodiments of the invention are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated or otherwise clearly contradicted by context. The use of any and all examples, or exemplary language (e.g., "such as") provided herein, is intended merely to better illustrate the invention and does not pose a limitation on the scope of the invention unless otherwise claimed. Finally, it should be understood that the illustrated embodiments are exemplary only, and should not be taken as limiting the scope of the invention.

What is claimed is:

1. An apparatus for producing kinetic imagery by continuously moving a flexible member in space between a lower position and an upper position comprising:

a flexible member suspended in a downwardly extending curve from two spaced flexible member endpoints, the flexible member being rotatably attached to a pulley reel at at least one of the endpoints;

at least one drive mechanism operating the pulley reel driven by a continuously reversing motor that reverses direction of rotation when the curve reaches the lower and upper positions to reel in and unreel the flexible member; and a control unit for operating the drive mechanism.

2. The apparatus of claim 1 in which the drive mechanism includes a stepper motor for driving the pulley wheel.

3. The apparatus of claim 2 including a control unit that tracks the instantaneous position of the stepper motor to synchronize the movements of the flexible members.

4. The apparatus of claim 1 in which the drive mechanism comprises a servo motor.

5. The apparatus of claim 1 in which the flexible member is chosen from the group consisting of: ropes, yarn, chains, beaded strings, belts, strings, cables, bands, and tubes.

6. The apparatus of claim 1 in which the flexible member is made from braided polyethylene terephthalate.

7. The apparatus of claim 1 in which the apparatus comprises multiple independent flexible members and corresponding drive mechanisms and a control unit for controlling the drive mechanisms to continuously and synchronously reel in and unreel the multiple flexible members.

8. The apparatus of claim 1 in which the flexible member the flexible member is rotatably attached to pulley reels at both spaced endpoints.

9. The apparatus of claim 1 in which the drive mechanism operating the pulley reel is mounted on a linear actuator.

10. The apparatus of claim 1 in which the endpoints are at the same level in space.

11. The apparatus of claim 1 in which the endpoints are at different levels in space.

12. An apparatus for producing kinetic imagery by continuously moving independently operated multiple flexible members in space between lower positions and upper positions comprising:

multiple flexible members suspended in downwardly extending curves from pairs of spaced flexible member endpoints, each of the flexible members being rotatably attached to corresponding pulley reels at at least one of their respective endpoints;

a separate drive mechanism operating each pulley reel driven by a motor that reverses direction of rotation when each curve reaches the lower and upper positions to reel in and unreel the flexible members; and a control unit for operating the drive mechanisms.

13. The apparatus of claim 12 in which the control units operate the independent drive mechanisms synchronously.

14. The apparatus of claim 12 including a control unit that tracks the instantaneous position of the servo motor to synchronize the movements of the flexible members.

15. The apparatus of claim 12 in which the rotation of the drive members of at least two of the flexible members are coordinated to move their corresponding flexible members up and down simultaneously.

16. An apparatus for producing kinetic imagery by continuously moving a flexible member in space between a lower position and an upper position comprising:

a flexible member suspended in a downwardly extending curve from two spaced flexible member endpoints, the flexible member being attached to a linear actuator at at least one of the endpoints;

at least one drive mechanism operating the linear actuator by continuously reversing the direction of the linear actuator when the curve reaches the lower and upper positions; and a control unit for operating the drive mechanism.

17. The apparatus of claim 16 in which the linear actuator is driven by a stepper motor.

18. The apparatus of claim 16 in which the linear actuator is driven by a servo motor.

* * * * *